United States Patent

Ditto

[11] 4,059,876
[45] Nov. 29, 1977

[54] METHOD OF ALLOYING AND FORMING A VALVE SEAT

[75] Inventor: Edwin D. Ditto, Bloomfield Hills, Mich.

[73] Assignee: General Motors Corporation, Detroit, Mich.

[21] Appl. No.: 738,432

[22] Filed: Nov. 3, 1976

[51] Int. Cl.² .................. B23P 15/00; B23K 26/00; B23P 3/02
[52] U.S. Cl. .................. 29/156.7 A; 29/157.1 R; 219/121 LM; 219/121 L; 72/342
[58] Field of Search .................. 29/156.7 R, 156.7 A, 29/157.1 R; 219/121 L, 121 LM, 149, 150, 154; 72/342; 75/65 EB

[56] References Cited

U.S. PATENT DOCUMENTS

| | | | |
|---|---|---|---|
| 3,198,182 | 8/1965 | Robinson et al. | 29/156.7 R |
| 3,362,057 | 1/1968 | Kubera et al. | 29/156.7 R |
| 3,461,001 | 8/1969 | Kubera | 29/156.7 R |
| 3,619,550 | 11/1971 | Matthews | 219/121 L |
| 3,632,398 | 1/1972 | Konig | 219/121 LM |
| 3,685,131 | 8/1972 | Fink | 29/156.7 A |
| 3,848,104 | 11/1974 | Locke | 219/121 L |
| 3,868,490 | 2/1975 | Aeschlimann et al. | 219/121 LM |
| 3,952,180 | 4/1976 | Gnanamuthu | 219/121 LM |
| 3,974,016 | 8/1976 | Bondybey et al. | 219/121 LM |

FOREIGN PATENT DOCUMENTS 1,245,751  9/1971  United Kingdom ............. 219/121 L

OTHER PUBLICATIONS

"Laser Right on the Beam for Heat Treating Duty," by B. D. Wakefield, from Iron Age, Feb. 10, 1975, pp. 45-47.

Primary Examiner—C.W. Lanham
Assistant Examiner—Daniel C. Crane
Attorney, Agent, or Firm—Warren D. Hill

[57] ABSTRACT

A mass of alloy material is deposited on a valve seat and is heated to alloying temperature by a laser beam which sweeps around the valve seat thereby alloying the valve seat. While the alloyed material is still at a high temperature, the forming tool is pressed against the valve seat to shape the valve seat to a configuration which requires little or no grinding.

2 Claims, 4 Drawing Figures

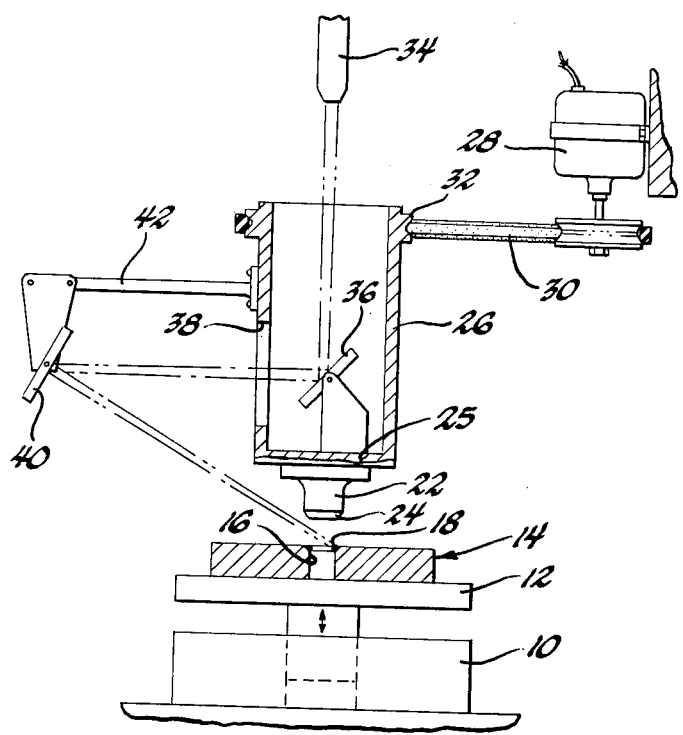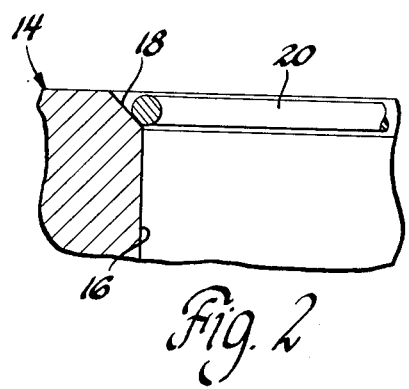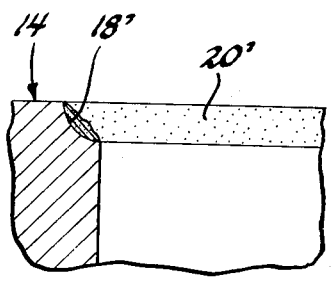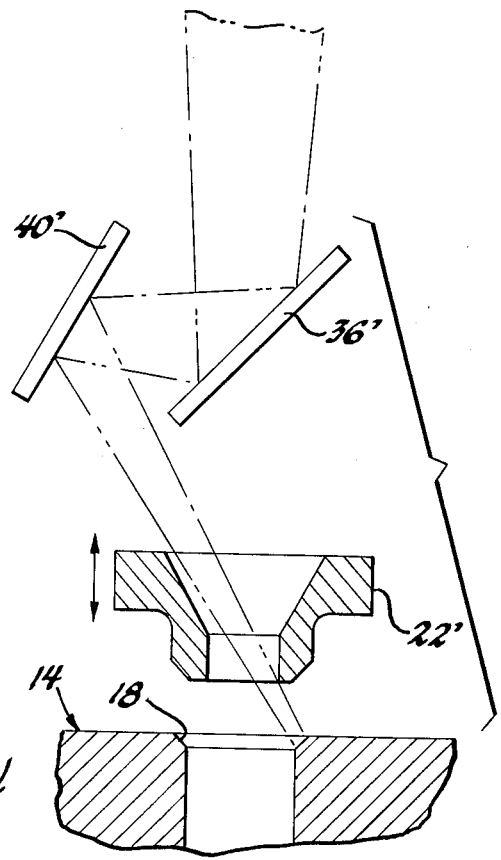
Fig. 1
Fig. 2
Fig. 3
Fig. 4

METHOD OF ALLOYING AND FORMING A VALVE SEAT

This invention relates to a method of alloying and forming a valve seat and particularly to such a method utilizing a beam of radiant energy.

In order to provide in an internal combustion engine valve seats which have a long life, it has been proposed to provide alloyed valve seats. Such alloyed valve seats are usually provided by inserts of alloy material pressed into the engine cylinder head. Special machining and insertion procedures are required for that operation. It is desired therefore to directly alloy the base metal of the cylinder head at the site of the valve seat thereby forming a hardenable and/or heat resistant and tough material for the valve seat. However, in order to finally form the valve seat, grinding or other machining of the hard alloy would normally be required. A goal of this invention is to form an alloyed valve seat in a cylinder head with little or no machining.

It is therefore an object of this invention to alloy a valve seat in a base metal and to form the valve seat while it is still at a high temperature from the alloying process.

The invention is carried out by depositing a mass of alloy material around a valve seat and focusing a beam of radiant energy onto a focal spot on the valve seat and sweeping the focal spot around the valve seat to melt and alloy the material to the base metal, and then engaging a forming tool with the valve seat while the valve seat is at a high temperature.

The above and other advantages will be made more apparent from the following specification taken in conjunction with the accompanying drawings wherein like reference numerals refer to like parts and wherein;

FIG. 1 is a schematic diagram of an apparatus for alloying and forming a valve seat according to the invention;

FIG. 2 is a partly broken away enlarged view of a portion of the valve seat of FIG. 1 in which alloy material is applied in the form of a wire;

FIG. 3 is an enlarged partly broken away section of a valve seat wherein the alloy material is applied as a powder; and FIG. 4 is a diagrammatic view of another embodiment of an apparatus for alloying and forming a valve seat according to the invention.

Referring to FIG. 1, a press 10 having a vertically movable ram 12 supports a workpiece 12 representing the cylinder head of an engine which contains a port 16 terminating at its upper surface in a beveled valve seat 18. As is better shown in FIG. 2, a wire ring 20 of alloy material is supported by the beveled valve seat 18. Directly above the valve seat 18 and aligned therewith is a forming tool 22 having a beveled working surface 24 for engagement with the beveled valve seat 18 when the head and forming tool are brought into contact. As shown in FIG. 1, the forming tool is spaced from the valve seat in a retracted position such that an annular space is defined by the beveled valve seat and beveled work surface 24. The forming tool 22 is supported at the bottom end plate 25 of a hollow cylindrical column 26 which is mounted by means, not shown, for rotation about its vertical axis by a motor 28 and belt 30 which latter engages a pulley 32 formed on the cylinder 26.

A laser 34 is mounted to direct a beam of radiant energy axially into the cylinder 26. A mirror 36 mounted within the cylinder 26 on the axis thereof directs the laser beam laterally through a port 38 in the cylinder 26 to a second mirror 40 mounted on a support arm 42 extending from the cylinder 26 and rotating therewith. The mirror 40 is adjusted at a suitable angle to direct the laser energy through the annular space to the valve seat 18 where it is focused to impinge on the alloy material 20 and the valve seat 18 at a small focal spot. The radiant energy of the laser beam is a power level sufficient to melt the alloy material and from an alloy with the base metal.

When the cylinder 26 is rotated by the motor, the laser beam sweeps around the cylinder axis so that the focal spot traverses the valve seat to heat the entire valve seat and the deposited material to alloying temperatures. Then the press 10 is energized to move the ram 12 upwardly to engage the forming tool 22 with the head 14 to form the alloyed valve seat while the valve seat is still at an elevated temperature suitable for forming. Since the forming tool 22 is supported by the rotating cylinder 26, the tool is rotating as it is urged against the valve seat. An alternative method is to provide a stationary forming tool if desired. Thus the valve seal in a single heating operation is alloyed and shaped to a configuration substantially like that desired for the valve seat so that little or no grinding or other machining of the alloy valve seat is required.

Many alloy materials are known to be suitable for the application to valve seats. Some examples of suitable materials are "Stellite," an aluminum-silicon alloy in a proportion of 88:12 and an iron-chromium alloy in a proportion of 74:26. Preferably such alloys are formed into a wire ring 20, the wire being in the order of 0.090 inch in diameter.

As shown in FIG. 3, it is also convenient to use the alloy in the form of a powder 20'. To support the alloy powder at the valve seat site, the head is machined into a cupped or concave depression 18' instead of the beveled seat 18. Then the cup shaped depression 18' is filled with alloy powder 20 and shaped into a mass approximating the desired beveled valve seat. The alloy material may be applied in other forms such as foil, for example.

Irrespective of which form of alloy application is desired, the laser requirements are a power level of 10–12 KW continuous wave output focused to a spot on the valve seat 0.70 – 0.080 inch in diameter. The focal spot is scanned around the valve seat at the rate of 60 to 80 inches per minute. One or two passes of the focal spot around the valve seat is sufficient to heat the valve seat and the alloy material to the desired alloying temperature. The press 10 provides a force of ten tons between the valve seat and the forming tool.

FIG. 4 illustrates diagrammatically an alternative apparatus for carrying out the method of the invention. The mirrors 36' and 40' are rotatably arranged in a laser beam to provide a sweeping laser beam for scanning the valve seat 18. A forming tool 22' suspended above the valve seat is formed with a hollow interior to allow passage of the laser beam therethrough thereby avoiding the necessity of providing a path around the forming tool 22 as in FIG. 1. In other respects, the structure and operation of the device is similar to that of FIG. 1.

It will thus been seen that the method according to this invention provides an improved process of manufacturing valve seats in engine heads and particularly will be adapted to form an alloyed valve seat integral with the head and which is shaped to require a minimum of grinding or other machining.

The embodiments of the invention in which an exclusive property or privilege is claimed are defined as follows:

1. A method of alloying and forming a valve seat in a base metal, the valve seat having an axis, comprising the steps of
    depositing a mass of alloy materials on the surface of the valve seat,
    aligning a forming tool with the valve seat axis for movement between a first retracted position spaced from the valve seat, defining an annular space between the tool and the valve seat, and a second valve seat engaging position,
    directing a beam of radiant energy through said annular space between the tool and the valve seat to impinge on the valve seat, said beam being focused at a limited focal spot for heating the said surface of the valve seat and the material deposited thereon at that spot,
    sweeping the beam of radiant energy to scan the limited focal spot and peripherally traverse the valve seat to heat the entire valve seat surface and the deposited material to alloying temperature,
    then immediately forming the alloyed valve seat by forcefully engaging the forming tool with the alloyed valve seat while the valve seat is at a temperature suitable for forming, whereby the valve seat is alloyed and shaped to a configuration which requires little or no grinding of the alloy.

2. A method of alloying and forming a valve seat in a base metal, the valve seat having an axis, comprising the steps of
    depositing a mass of alloy material on the surface of the valve seat,
    aligning a forming tool with the valve seat axis for movement between a first retracted position spaced from the valve seat, defining an annular space between the tool and the valve seat, and a second valve seat engaging position,
    providing a laser beam having a power level sufficient to quickly melt the alloy material and alloy it to the valve seat,
    directing the laser beam through said annular space between the tool and the valve seat by a system of mirrors to impinge on the valve seat, said beam being focused at a limited focal spot for heating the said surface of the valve seat and the material deposited thereon at that spot,
    sweeping the laser beam by rotating the system of mirrors to scan the limited focal spot and peripherally traverse the valve seat to heat the entire valve seat surface and the deposited material to alloying temperature,
    then immediately hot forming the alloyed valve seat by rotating the forming tool and forcefully engaging the forming tool with the alloyed valve seat while the valve seat is at a temperature suitable for forming, whereby the valve seat is alloyed and shaped to a configuration which requires little or no grinding of the alloy.

* * * * *

UNITED STATES PATENT AND TRADEMARK OFFICE
CERTIFICATE OF CORRECTION

PATENT NO. : 4,059,876

DATED : November 29, 1977

INVENTOR(S) : Edwin D. Ditto

It is certified that error appears in the above-identified patent and that said Letters Patent are hereby corrected as shown below:

Column 1, line 49, "12" should read -- 14 --.

Column 2, line 9, "from" should read -- form --; line 22, "seal" should read -- seat --.

Signed and Sealed this

Eighteenth Day of April 1978

[SEAL]

Attest:

RUTH C. MASON
Attesting Officer

LUTRELLE F. PARKER
Acting Commissioner of Patents and Trademarks